United States Patent
Bourquin et al.

(10) Patent No.: US 11,823,426 B2
(45) Date of Patent: Nov. 21, 2023

(54) AMBIENT LIGHT SUPPRESSION

(71) Applicant: KONINKLIJKE PHILIPS N.V., Eindhoven (NL)

(72) Inventors: Yannyk Parulian Julian Bourquin, Eindhoven (NL); Emilie Cuillery, Eindhoven (NL); Mathivanan Damodaran, Eindhoven (NL); Jonathan Alambra Palero, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/922,065

(22) PCT Filed: May 7, 2021

(86) PCT No.: PCT/EP2021/062136
§ 371 (c)(1),
(2) Date: Oct. 28, 2022

(87) PCT Pub. No.: WO2021/228709
PCT Pub. Date: Nov. 18, 2021

(65) Prior Publication Data
US 2023/0171387 A1   Jun. 1, 2023

(30) Foreign Application Priority Data
May 15, 2020   (EP) .................................... 20174915

(51) Int. Cl.
*H04N 9/74* (2006.01)
*H04N 9/31* (2006.01)
*G06V 10/145* (2022.01)

(52) U.S. Cl.
CPC ......... *G06V 10/145* (2022.01); *H04N 9/3194* (2013.01); *H04N 9/74* (2013.01)

(58) Field of Classification Search
CPC ........... H04N 9/74; H04N 9/3194; H04N 9/31
(Continued)

(56) References Cited

U.S. PATENT DOCUMENTS

| 9,124,762 B2 | 9/2015 | Cutler |
| 2009/0207269 A1 | 8/2009 | Yoda |

(Continued)

FOREIGN PATENT DOCUMENTS

| CN | 107623817 A | 1/2018 |
| WO | 2013027027 A2 | 2/2013 |
| WO | 2013027027 A3 | 4/2013 |

OTHER PUBLICATIONS

D. J. Cuccia, F. Bevilacqua, A. J. Durkin, F. R. Ayers, and B. J. Tromberg, "Quantitation and mapping of tissue optical properties using modulated imaging," J. Biomed. Opt. 14, 024012-024012-13 (2009).
(Continued)

*Primary Examiner* — Sherrie Hsia

(57) ABSTRACT

According to an aspect, there is provided a system (200) comprising: an image projection unit (210) configured to project an illumination pattern onto at least a portion of a scene, an imaging unit (220) configured to capture a plurality of images of the scene while the illumination pattern is projected onto the scene, and a processing unit (230) configured to: demodulate the plurality of images based on the illumination pattern and with respect to a target section in the plurality of captured images, wherein the target section corresponds to one of: a portion of the scene on which the illumination pattern is selectively projected while the plurality of images were captured, a portion of the scene at which the projected illumination pattern is resolvable, a portion of the scene with pixel depth values which satisfy a predetermined range; and generate an ambient light suppressed image of the scene based on results of the demodulation.

20 Claims, 7 Drawing Sheets

(58) Field of Classification Search
USPC .................................. 348/576, 602, 739, 744
See application file for complete search history.

(56) References Cited

U.S. PATENT DOCUMENTS

| | | |
|---|---|---|
| 2013/0194375 A1 | 8/2013 | Michrowski et al. |
| 2014/0176663 A1 | 6/2014 | Cutler et al. |
| 2019/0101382 A1 | 4/2019 | Taubin et al. |
| 2019/0101383 A1 | 4/2019 | Ioachim et al. |

OTHER PUBLICATIONS

D. J. Cuccia, F. Bevilacqua, A. J. Durkin, and B. J. Tromberg, "Modulated imaging: quantitative analysis and tomography of turbid media in the spatial-frequency domain," Opt. Lett. 30, 1354-1356 (2005).
J. S. Hyun and S. Zhang, "Superfast 3D absolute shape measurement using five binary patterns," Opt. Lasers Eng. 90, 217-224 (2017).
Bodenschatz Nico et al., "Diffuse optical microscopy for quantification of depth-dependent epithelial backscattering in the cervix", Journal of Biomedical optics, spie, vol. 21, No. 6, Jun. 1, 2016, (Jun. 1, 2016), p. 66001, XP060072000, ISSN: 1083-3668, DOI: 10.1117/1.JBO.21.6.066001 [retrieved on Jun. 1, 2016] Section 3.
International search report for patent application No. PCT/EP2021/062136 dated Jul. 23, 2021.

AMBIENT LIGHT SUPPRESSION

CROSS-REFERENCE TO PRIOR APPLICATIONS

This application is the U.S. National Phase application under 35 U.S.C. § 371 of International Application No. PCT/EP2021/062136, filed on May 7, 2021, which claims the benefit of European Patent Application No. 20174915.7 filed on May 15, 2020. These applications are hereby incorporated by reference herein.

FIELD OF THE INVENTION

The present disclosure relates to a system for performing ambient light suppression and a method for controlling thereof.

BACKGROUND OF THE INVENTION

There has been considerable development and investment in exploratory activities in digital innovation in the field of non-obtrusive measurement and monitoring, specifically on skin sensing for personal care and health applications. Currently known skin measurement systems promise skin quantification and monitoring of features of skin that offer consumers information related to changes that may be too small to detect, too faint to notice, and/or too slow to follow. For these systems to be acceptable by consumers, sensing methods and systems should be sensitive as well as specific. Additionally, robustness of measurement is essential to build consumer trust. One critical issue associated with such imaging-based systems, when placed in an uncontrolled environment (e.g. at home) is the undefined and potentially varying ambient lighting.

Modulated imaging techniques, such as spatial frequency domain imaging (SFDI), are techniques that use projections of specific light patterns, phase shifted sinusoid patterns mainly, to generate images that can be used for analysis of skin properties for instance. Three spatially modulated images with the same sinusoidal pattern, but phase-shifted, are sufficient to recreate a demodulated AC image where all the DC components of light is excluded, therefore removing the ambient light. Demodulation requires three images of the object of interest $I_1$, $I_2$, and $I_3$ recorded with projection of the sinusoidal pattern with the same spatial frequency, but with $2/3\pi$ phase difference each (0, $2/3\pi$, $4/3\pi$). The demodulation of the images can be represented by the formulae (1) and (2) below:

$$M_{AC} = \frac{\sqrt{2}}{3}\left((I_1 - I_2)^2 + (I_2 - I_3)^2 + (I_1 - I_3)^2\right)^{1/2} \quad (1)$$

$$M_{DC} = (I_1 + I_2 + I_3)/3 \quad (2)$$

where $M_{AC}$ is the AC component of the image (which can be regarded to correspond to the modulated illumination), and $M_{DC}$ is the DC component of the image (which can be regarded to correspond to the ambient illumination).

As an example, FIG. 1 illustrates an ambient light correction operation by way of a number of images. Specifically, FIG. 1 includes an initial image 110, a plurality of modulated images 120A, 120B, and 120C, as well as demodulated images 130 and 140 which show how ambient light can be corrected for based on a number of modulated images. In the context of this disclosure, the term "modulated image" may refer to an image which depicts a modulated pattern being projected onto a part of a scene, and the term "demodulated image" may refer to an image that underwent demodulation with respect to the depicted modulated pattern.

In the initial image 110, the scene is only illuminated by ambient light and it can be seen that the face is unevenly illuminated. Each of a first modulated image 120A, a second modulated image 120B, and a third modulated image 120C is associated with a different phase shift. In this example, the first modulated image 120A is associated with a 0° phase shift, the second modulated image 120B is associated with a 120° phase shift, and the third modulated image 120C is associated with a 240° phase shift. The uneven illumination that is presented in the initial image 110 can be corrected by performing demodulation of the modulated images 120A, 120B, and 120C according to formulae (1) and (2) as presented above, so as to generate an AC component 130 and a DC component 140. Specifically, the three sinusoidal patterns captured in the three modulated images 120A, 120B, and 120C are demodulated to arrive at the demodulated images 130 and 140, which respectively correspond to the AC component 130 (representing the alternating part of the demodulated signal) and the DC component 140 (representing the constant part of the demodulated signal). In this case, the AC component 130 corresponds to the modulated illumination while the scene is illuminated with both the projected modulated illumination and ambient illumination, while the DC component 140 of the image corresponds to the ambient illumination while the scene is illuminated with both the modulated illumination and ambient illumination. Accordingly, the AC component 130 may be regarded as an "ambient light corrected/suppressed" version that represents the scene depicted in the initial image 110.

It is noted that US patent application US 2019/0101383 A1 discloses a technique for determining an object using structured light to overcome ambient light effects. The technique according to US 2019/0101383 A1 utilizes structured light of various spatial frequencies.

It is further noted that Bodenschatz et al. in their paper "Diffuse optical microscopy for quantification of depth-dependent epithelial backscattering in the cervix" (Journal of Biomedical Optics (vol. 21, no. 6, 1 Jun. 2016) discuss the use of structured light of different spatial frequencies to make observation at different tissue depths.

SUMMARY OF THE INVENTION

In some smart mirror systems there may be provided an imaging unit (e.g. a cameral for recording images and/or videos of the face or other parts of a user's body for skin analysis. One of the concerns associated with these systems is the potential or perceived intrusion of privacy. In currently known systems, the imaging units do not discriminate between a user and other elements in the background, and even if only the face of a user is recorded it would still be relatively easy to recognise the user. For example, in a currently available system blurring is used to hide the region of an image that is not of interest.

According to a first specific aspect, there is provided a system for performing ambient light suppression, the system comprising: an image projection unit configured to project an illumination pattern onto at least a portion of a scene, wherein the illumination pattern is a time-varying spatially modulated pattern having a predetermined spatial frequency; an imaging unit configured to capture a plurality of images of the scene while the time-varying spatially modulated illumination pattern having a predetermined spatial frequency is projected onto the scene; and a processing unit configured to: demodulate the plurality of images based on the illumination pattern and with respect to a target section in the plurality of captured images, wherein the target section corresponds to one of: a portion of the scene on which the illumination pattern is selectively projected while the plurality of images were captured, a portion of the scene at which the projected illumination pattern is resolvable, a portion of the scene with pixel depth values which satisfy a predetermined range, wherein the target section is a part of the field of view of the imaging unit, and generate an ambient light suppressed image of the scene based on results of the demodulation.

In some embodiments, the image projection unit may be configured to only selectively project the illumination pattern onto a selected portion of the field of view of the imaging unit, and the target section corresponds to a portion of the scene on which the illumination pattern is selectively projected. In these embodiments, the processing unit may be configured to demodulate the plurality of images with respect to the target section such that the generated ambient light suppressed image of the scene only depicts one or more elements included in the selected portion of the field of view of the imaging unit.

In some embodiments the imaging unit may be configured to capture the plurality of images of the scene at a predetermined focal depth, the predetermined spatial frequency of the illumination pattern and the predetermined focal depth of the imaging unit being selected such that the illumination pattern is only resolvable within a certain distance from the focus of the imaging unit, and wherein the target section corresponds to a portion of the scene at which the projected illumination pattern is resolvable. In these embodiment, the processing unit may be configured to demodulate the plurality of images with respect to the target section such that the generated ambient light suppressed image of the scene only depicts one or more elements included in field of view within the certain distance range from the focus of the imaging unit.

In some embodiments, the processing unit may be configured to analyse the plurality of images to determine 3D depth information of the scene. The 3D depth information may comprise depth values for each of the pixels of the plurality of images and the target section may be based on the 3D depth information of the scene. In these embodiments, the processing unit may be configured to generate the ambient light suppressed image of the scene by only outputting the demodulation results with respect to the target section.

In some embodiments, the processing unit may be configured to determine the target section by applying a phase mask to the plurality of images.

In some embodiments, the illumination pattern may comprise a phase-shifting sinusoidal pattern, and the imaging unit may be configured to capture the plurality of images at a predetermined phase difference with respect to the phase of the sinusoidal pattern.

In some embodiments, the illumination pattern may further comprise at least one phase ramp of a predetermined step size.

In some embodiments, the imaging unit may be configured to capture, while the illumination pattern is projected onto the scene, three sets of images. In these embodiments, a first set of the three sets of images may correspond to a 0° phase shift of the sinusoidal pattern, a second set of the three sets of images may correspond to 120° phase shift of the sinusoidal pattern, and a third set of the three sets of images may correspond to 240° phase shift of the sinusoidal pattern.

In some embodiments, the imaging unit may comprise a colour camera and each of the first, second, and third set of images may comprise a single image.

In some embodiments, each of the first, second and third set of images may comprise three images. The first image in each of the three of sets of images may correspond to the red colour channel, the second image in each of the three sets of images may correspond to the green colour channel, and the third image in each of the three sets of images may correspond to the blue colour channel.

In some embodiments, the processing unit may be configured to demodulate the plurality of image to produce a first image corresponding to the AC component and a second image correspond to the DC component. In these embodiments, the first image may be selected as the ambient light suppressed image of the scene.

According to a second specific aspect, there is provided a method for controlling a system to perform ambient light suppression. The system comprises an image projection unit, an imaging unit, and a processing unit, and the method comprises, projecting, by the image projection unit, an illumination pattern onto at least a portion of a scene, wherein the illumination pattern is a time-varying spatially modulated pattern; capturing, by the imaging unit, a plurality of images of the scene while the time-varying spatially modulated illumination pattern is projected onto the scene; and demodulating, by the processing unit, the plurality of images based on the illumination pattern and with respect to a target section in the plurality of captured images, wherein the target section corresponds to one of: a portion of the scene on which the illumination pattern is selectively projected while the plurality of images were captured, a portion of the scene at which the projected illumination pattern is resolvable, a portion of the scene with pixel depth values which satisfy a predetermined range; and generating, by the processing unit, an ambient light suppressed image of the scene based on results of the demodulation.

In some embodiments, projecting the illumination pattern onto at least a portion of the scene may comprise only selectively projecting the illumination pattern onto a selected portion of the field of view of the imaging unit. In these embodiments, the target section may correspond to a portion of the scene on which the illumination pattern is selectively projected. Also, in these embodiments, demodulating the plurality of images with respect to the target section may be performed such that the generated ambient light suppressed image of the scene only depicts one or more elements included in the selected portion of the field of view of the imaging unit.

In some embodiments, the illumination pattern may have a predetermined spatial frequency, and the capturing the plurality of images of the scene may be performed at a predetermined focal depth. In these embodiments, the predetermined spatial frequency of the illumination pattern and the predetermined focal depth of the imaging unit may be selected such that the illumination pattern is only resolvable within a certain distance from the focus of the imaging unit, and the target section may correspond to a portion of the scene at which the projected illumination pattern is resolvable. Furthermore, demodulating the plurality of images with respect to the target section may be performed such that the generated ambient light suppressed image of the scene only depicts one or more elements included in field of view within the certain distance range from the focus of the imaging unit.

According to a third specific aspect, there is provided a computer program product comprising a computer readable medium, the computer readable medium having computer readable code embodied therein, the computer readable code being configured such that, on execution by a suitable computer or processor, the computer or processor is caused to perform the method as described herein.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

As noted above, there is provided an improved system for per forming ambient light suppression and a method for controlling thereof, which address the existing problems.

Figure 2:
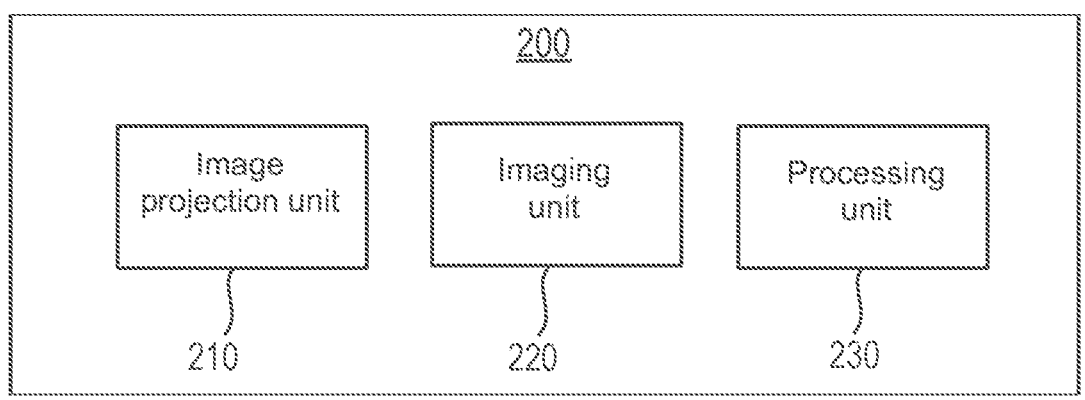
FIG. 2 shows a block diagram of a system according to an embodiment.

FIG. 2 shows a block diagram of a system 200 according to an embodiment, which can be used for performing ambient light suppression, specifically for ambient light suppression in images. As illustrated in FIG. 2, the system comprises an image projection unit 210, an imaging unit 220, and a processing unit 230.

The image projection unit 210 is configured to project an illumination pattern onto at least a portion of a scene. The illumination pattern is a time-varying spatially modulated pattern, and may comprise a phase-shifting sinusoidal pattern. In addition, in some embodiments the illumination pattern may further comprise at least one phase ramp of a predetermined step size. In some embodiments, the illumination pattern may have a predetermined spatial frequency and/or a predetermined wavelength. Furthermore, in some embodiments the image projection unit 210 may be configured to project the illumination pattern in a manner that is focused on an object plane of the scene.

In some embodiments, the image projection unit 210 may be configured to only selectively project the illumination pattern onto a selected portion of the field of view of the imaging unit.

The imaging unit 220 is configured to capture a plurality of images of the scene while the time-varying spatially modulated illumination pattern is projected onto the scene. The imaging unit 220 may be configured to capture, while the illumination pattern is projected onto the scene, three sets of images. In these three sets of images, a first set may correspond to a 0° phase shift of the sinusoidal pattern, a second set may correspond to 120° phase shift of the sinusoidal pattern, and a third set of may correspond to 240° phase shift of the sinusoidal pattern.

In some embodiments, the imaging unit comprises a colour camera, and each of the first, second, and third set of images comprises a single image. In some alternative embodiments, each of the first, second and third set of images may comprise three images. In these alternative embodiments, the first image in each of the three of sets of images may correspond to the red colour channel, the second image in each of the three sets of images may correspond to the green colour channel, and the third image in each of the three sets of images may correspond to the blue colour channel.

In some embodiments, the imaging unit 220 may be configured to capture the plurality of images of the scene at a predetermined focal depth. In some embodiments where the imaging unit 220 is configured to capture the plurality of images of the scene at a predetermined focal depth and where the illumination pattern has a predetermined spatial frequency, the predetermined spatial frequency of the illumination pattern and the predetermined focal depth of the imaging unit may be selected such that the illumination pattern is only resolvable within a certain distance from the focus of the imaging unit 220.

As mentioned above, in some embodiments the illumination pattern may comprise a phase-shifting sinusoidal pattern. In these embodiments, the imaging unit 220 may be configured to capture the plurality of images at a predetermined phase difference with respect to the phase of the sinusoidal pattern.

The processing unit 230 is configured to demodulate the plurality of images based on the illumination pattern and with respect to a target section in the plurality of captured images. The target section corresponds to one of a portion of the scene on which the illumination pattern is selectively projected while the plurality of images were captured, a portion of the scene at which the projected illumination pattern is resolvable, a portion of the scene with pixel depth values which satisfy a predetermined range. Furthermore, the processing unit 230 is also configured to generate an ambient light suppressed image of the scene based on results of the demodulation.

Figure 1:
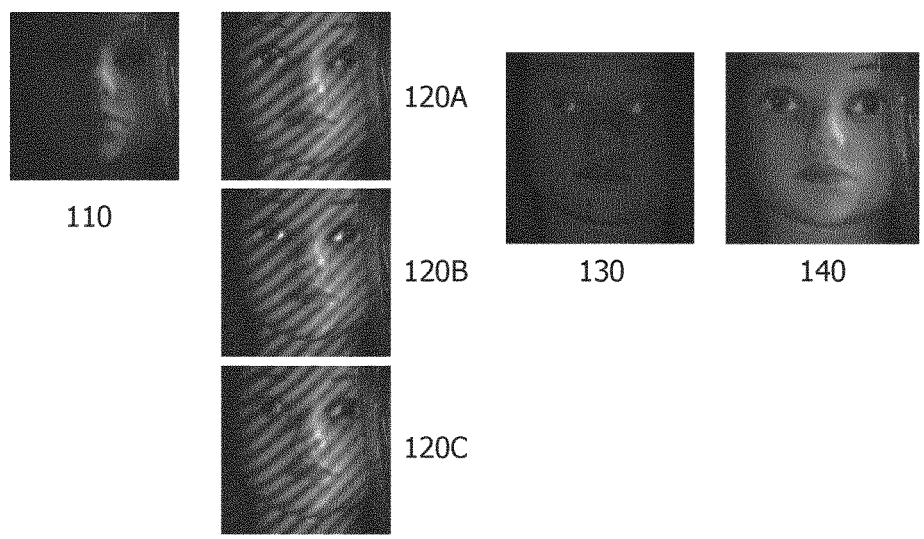
FIG. 1 illustrates an example of ambient light correction operation by way of a number of images.

The processing unit 230 may be configured to demodulate the plurality of images to produce a first image corresponding to the AC component and a second image correspond to the DC component. The AC component may correspond to the alternating part of a demodulated signal associated with the plurality of images, and the DC component may correspond to the constant part of the demodulated signal. In these embodiments, the first image may be selected as the ambient light suppressed image of the scene. It will be appreciated that the demodulation may be performed, for example, using formulae (1) and (2) as presented above with reference to FIG. 1. It will also be appreciated that other formulae not explicitly discussed here may be used for obtaining the AC and DC components of the signal, e.g. those associated with Discrete Cosine Transform, Fourier transform, etc.

As mentioned above, in some embodiments the image projection unit 210 may be configured to only selectively project the illumination pattern onto a selected portion of the field of view of the imaging unit. In these embodiments, the target section may correspond to a portion of the scene on which the illumination pattern is selectively projected. Moreover, in these embodiments, the processing unit 230 may be configured to demodulate the plurality of images with respect to the target section such that the generated ambient light suppressed image of the scene only depicts one or more elements included in the selected portion of the field of view of the imaging unit 220.

As mentioned above, in some embodiments where the imaging unit 220 is configured to capture the plurality of images of the scene at a predetermined focal depth and where the illumination pattern has a predetermined spatial frequency, the predetermined spatial frequency of the illumination pattern and the predetermined focal depth of the imaging unit may be selected such that the illumination pattern is only resolvable within a certain distance from the focus of the imaging unit 220. In addition, in these embodiments, the target section may correspond to a portion of the scene at which the projected illumination pattern is resolvable, and the processing unit 230 may be configured to demodulate the plurality of images with respect to the target section such that the generated ambient light suppressed image of the scene only depicts one or more elements included in field of view within the certain distance range from the focus of the imaging unit 220.

In some embodiments, the processing unit 230 may be configured to analyse the plurality of images to determine three-dimensional (3D) depth information of the scene. The 3D depth information may comprise depth values for each of the pixels of the plurality of images. In addition, in these embodiments, the target section may be based on the 3D depth information of the scene. The processing unit 230 may be configured to generate the ambient light suppressed image of the scene by only outputting the demodulation results with respect to the target section.

Furthermore, in these embodiments, the processing unit 230 may be configured to determine the target section by applying a phase mask to the plurality of images.

In general, the processing unit 230 can control the operation of the system 200 and can implement the method described herein. The processing unit 230 can comprise one or more processors, processing units, multi-core processor or modules that are configured or programmed to control the system 200 in the manner described herein. In particular implementations, the processing unit 230 can comprise a plurality of software and/or hardware modules that are each configured to perform, or are for performing, individual or multiple steps of the method described herein.

Although not illustrated in FIG. 2, in some embodiments the system 200 may further comprise at least one user interface. Alternative or in addition, at least one user interface may be external to (i.e. separate to or remote from) the system 200. For example, at least one user interface may be part of another device. A user interface may be for use in providing a user of the system 200 with information resulting from the method described herein. Alternatively or in addition, a user interface may be configured to receive a user input. For example, a user interface may allow a user of the system 200 to manually enter instructions, data, or information. In these embodiments, the processing unit 230 may be configured to acquire the user input from one or more user interface.

A user interface may be any user interface that enables the rendering (or output or display) of information to a user of the system 200. Alternatively or in addition, a user interface may be any user interface that enables a user of the system 200 to provide a user input, interact with and/or control the system 200. For example, the user interface may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the system 200 may comprise a memory. Alternatively or in addition, one or more memories may be external to (i.e. separate to or remote from) the system 200. For example, one or more memories may be part of another device. A memory can be configured to store program code that can be executed by the processing unit 230 to perform the method described herein. A memory can be used to store information, data, signals and measurements acquired or made by the processing unit 230 of the system 200. For example, a memory may be used to store the plurality of captured images, the plurality of candidate images, and/or the ambient light suppressed image. The processing unit 230 may be configured to control a memory to store the plurality of captured images, the plurality of candidate images, and/or the ambient light suppressed image.

In some embodiments, the system 200 may comprise a communications interface (or circuitry) for enabling the system 200 to communicate with any interfaces, memories and/or devices that are internal or external to the system 200. The communications interface may communicate with any interfaces, memories and/or devices wirelessly or via a wired connection. For example, the communications interface may communicate with one or more user interfaces wirelessly or via a wired connection. Similarly, the communications interface may communicate with the one or more memories wirelessly or via a wired connection.

It will be appreciated that FIG. 2 only shows the components required to illustrate an aspect of the system 200 and, in a practical implementation, the system 200 may comprise alternative or additional components to those shown.

Figure 3:
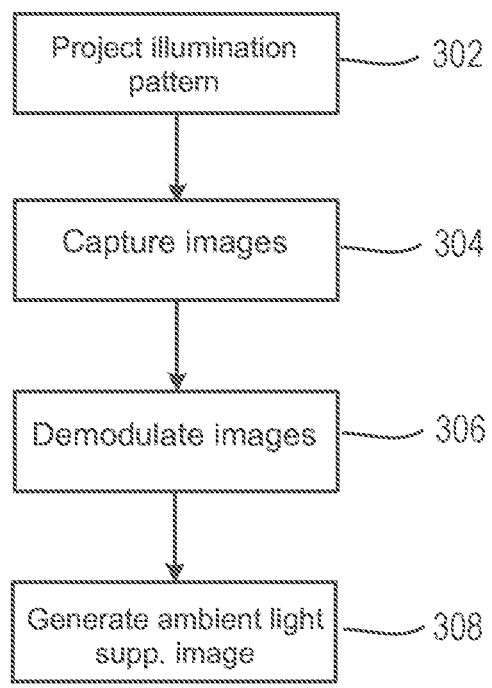
FIG. 3 illustrates a method for controlling a system to perform ambient light suppression, according to an embodiment.

FIG. 3 illustrates a method for controlling a system to perform ambient light suppression. The illustrated method can generally be performed by the system 200, and specifically in some embodiments by or under the control of processing unit 230 of the system 200. For the purpose of illustration, at least some of the blocks in FIG. 3 will be described in the following with reference to the various components of the system 200 of FIG. 2.

With reference to FIG. 3, at block 302, an illumination pattern is projected onto at least a portion of a scene. The projection may be performed by the image projection unit 210 of the system 200, and this projection may be performed in a manner that is focused on an object plane of the scene. The illumination pattern is a time-varying spatially modulated pattern such as a phase-shifting sinusoidal pattern, and the imagine unit is configured to capture the plurality of images at a predetermined phase difference with respect to the phase of the sinusoidal pattern. In some embodiments, the illumination pattern may have a predetermined spatial frequency and/or a predetermined wavelength. Alternatively or in addition, the illumination pattern may comprise at least one phase ramp of a predetermined step size.

In some embodiments, projecting the illumination pattern onto at least a portion of the scene at block 302 may comprise only selectively projecting the illumination pattern onto a selected portion of the field of view of the imaging unit.

Returning to FIG. 3, at block 304, a plurality of images of the scene are captured while the time-varying spatially modulated illumination pattern is projected onto the scene at block 302. Thus, at least in some embodiments, the steps illustrated in block 302 and block 304 may be regarded as being performed simultaneously. The capturing of the plurality of images may be performed by the imaging unit 220 of the system 200.

As mentioned above, in some embodiments the illumination pattern may comprise a phase-shifting sinusoidal pattern. In these embodiments, capturing the plurality of images at block 304 may be performed at a predetermined phase difference with respect to the phase of the sinusoidal pattern.

In some embodiments, at block 304 three sets of images are captured while the illumination pattern is projected onto the scene. In these embodiments, a first set of the three sets of images may correspond to a 0° phase shift of the sinusoidal pattern, a second set of the three sets of images may correspond to 120° phase shift of the sinusoidal pattern, and a third set of the three sets of images may correspond to 240° phase shift of the sinusoidal pattern. In some of these embodiments, each of the first, second, and third set of images may comprise a single image. Alternatively, each of the first, second and third set of images may comprise three images—the first image in each of the three of sets of images may correspond to the red colour channel, the second image in each of the three sets of images may correspond to the green colour channel, and the third image in each of the three sets of images may correspond to the blue colour channel.

Returning to FIG. 3, at block 306, the plurality of images captured at block 304 are demodulated based on the illumination pattern and with respect to a target section in the plurality of captured images. The demodulation at block 306 may be performed by the processing unit 230 of the system 200. The target section corresponds to one of: a portion of the scene on which the illumination pattern is selectively projected while the plurality of images were captured, a portion of the scene at which the projected illumination pattern is resolvable, a portion of the scene with pixel depth values which satisfy, a predetermined range.

Returning to FIG. 3, at block 308, an ambient light suppressed image of the scene is generated based on results of the demodulation. The generation of the ambient light suppressed image may be performed by the processing unit 230 of the system 200.

In some embodiments, demodulating the plurality of images at block 306 may produce a first image corresponding to the AC component and a second image correspond to the DC component. The AC component may correspond to the alternating part of a demodulated signal associated with the plurality of images, and the DC component may correspond to the constant part of the demodulated signal. In these embodiments, at block 308 the first image may be selected as the ambient light suppressed image of the scene. It will be appreciated that the demodulation may be performed, for example, using formulae (1) and (2) as presented above with reference to FIG. 1. It will also be appreciated that other formulae not explicitly discussed here may be used for obtaining the AC and DC components of the signal, e.g. those associated with Discrete Cosine Transform, Fourier transform, etc.

As mentioned above with reference to block 302, in some embodiments projecting the illumination pattern onto at least a portion of the scene at block 302 may comprise only selectively projecting the illumination pattern onto a selected portion of the field of view of the imaging unit. In these embodiment, the target section may correspond to a portion of the scene on which the illumination pattern is selectively projected, and demodulating the plurality of images with respect to the target section at block 306 may be performed such that the ambient light suppressed image of the scene generated at block 308 only depicts one or more elements included in the selected portion of the field of view of the imagine unit.

As mentioned above, in some embodiments the illumination pattern may have a predetermined spatial frequency. In these embodiments, capturing the plurality of images of the scene at block 304 may be performed at a predetermined focal depth. The predetermined spatial frequency of the illumination pattern and the predetermined focal depth of the imaging unit in these embodiments may be selected such that the illumination pattern is only resolvable within a certain distance from the focus of the imaging unit 220 of the system 200. In addition, the target section may correspond to a portion of the scene at which the projected illumination pattern is resolvable. Moreover, in these embodiments demodulating the plurality of images with respect to the target section at block 3061 may be performed such that the ambient light suppressed image of the scene generated at block 308 only depicts one or more elements included in field of view within the certain distance range from the focus of the imaging unit 220 of the system 200.

Although not illustrated in FIG. 3, in some embodiments the method may further comprise analysing the plurality of images to determine 3D depth information of the scene. The 3D depth information may comprise depth values for each of the pixels of the plurality of images and in these embodiments the target section may be based on the 3D depth information of the scene. In this regard, the method may further comprise determining the target section by applying a phase mask to the plurality of images captured at block 304.

Furthermore, in these embodiments generating the ambient light suppressed image of the scene at block 308 may be performed by only outputting the demodulation results with respect to the target section.

Figure 4:
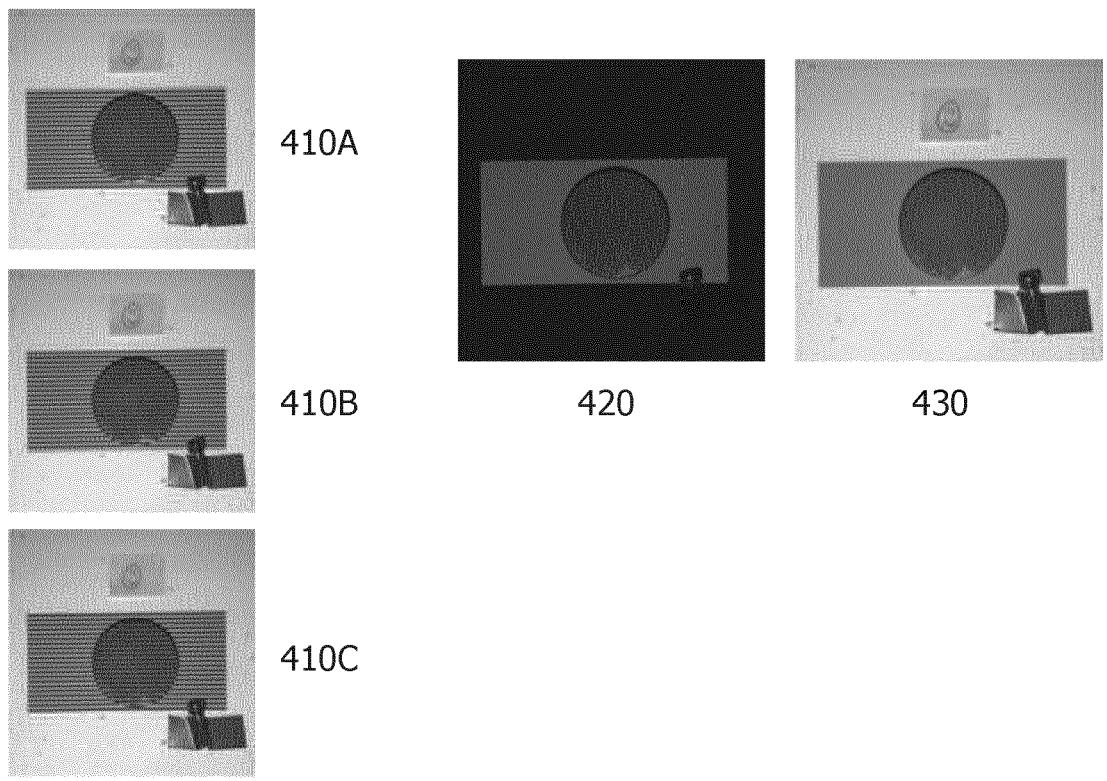
FIG. 4 illustrates an ambient light suppression operation by way of a number of images, according to an embodiment.

FIG. 4 illustrates an ambient light suppression operation by way of a number of images, according to an embodiment. The illustrated operation can generally be performed by the system 200, and specifically in some embodiments by or under the control of processing unit 230 of the system 200. For the purpose of illustration, at least parts of the operation illustrated in FIG. 4 will be described in the following with reference to the various components of the system 200 of FIG. 2.

As shown in FIG. 4, there is provided a plurality of modulated images 410A, 410B, and 410C, an AC component image 420, and a DC component image 430. The plurality of modulated images comprises a first modulated image 410A, a second modulated image 410B, and a third modulated image 410C. The AC component image 420 may correspond to the alternating part of a demodulated signal, and the DC component 430 image may correspond to the constant part of the demodulated signal.

It can be seen for the present embodiment in each of the first modulated image 410A, the second modulated image 410B, and the third modulated image 410C, an illumination pattern is selectively projected by the image projection unit

210 of the system 200 onto a selected (rectangular) portion. The illumination pattern is a time-varying spatially modulated pattern. Specifically, in this embodiment, the illumination pattern consists of a plurality of alternate horizontal dark and bright bands.

In this embodiment, the selected portion onto which the illumination pattern is projected corresponds to a portion of the field of view of the imaging unit 220 of the system 200, rather than all of the field of view of the imaging unit 220. Moreover, each of the modulated images in this embodiment have been captured at a different point in time that corresponds to a respectively different phase shift of the projected illumination pattern. In the first modulated image 410A the illumination pattern has a 0° phase shift, in the second modulated image 410A, the illumination pattern has a 120° phase shift, and in the third modulated image 410C, the illumination pattern has a 240° phase shift.

Once the modulated images 410A, 410B, and 410C have been captured, the processing unit 230 of the system 200 can demodulate the modulated images 410A, 410B, and 410C based on the illumination pattern depicted in these modulated images, as well as with respect to a target section, which in this embodiment corresponds to a portion of the scene on which the illumination pattern is selectively projected. Subsequently, the processing unit 230 can generate an ambient light suppressed image of the scene based on the results of the demodulation.

In more detail, the processing unit 230 can demodulate the modulated images 410A, 410B, and 410C with respect to the target section such that the generated ambient light suppressed image of the scene only depicts one or more elements included in the selected portion of the field of view of the imaging unit 220. In other words, in this embodiment the generated ambient light suppressed image of the scene only depicts element(s) included in the rectangular portion onto which the illumination pattern is projected. The processing unit 230 can demodulate the modulated images 410A, 410B, and 410C to produce a first image corresponding to the AC component (i.e. AC component image 420) and a second image corresponding to the DC component (i.e. DC component image 430), where the AC component corresponds to the alternating part of a demodulated signal associated with the modulated images, and the DC component corresponds to the constant part of the demodulated signal. It will be appreciated that the demodulation may be performed, for example, using formulae (1) and (2) as presented above with reference to FIG. 1. It will also be appreciated that other formulae not explicitly discussed here may be used for obtaining the AC and DC components of the signal, e.g. those associated with Discrete Cosine Transform, Fourier transform, etc.

In this case, the AC component image 420 is selected as the ambient light suppressed image of the scene. Thus, elements that are in the scene of the modulated images but not in the selected portion can be excluded in the ambient light suppressed image of the scene.

Figure 5:
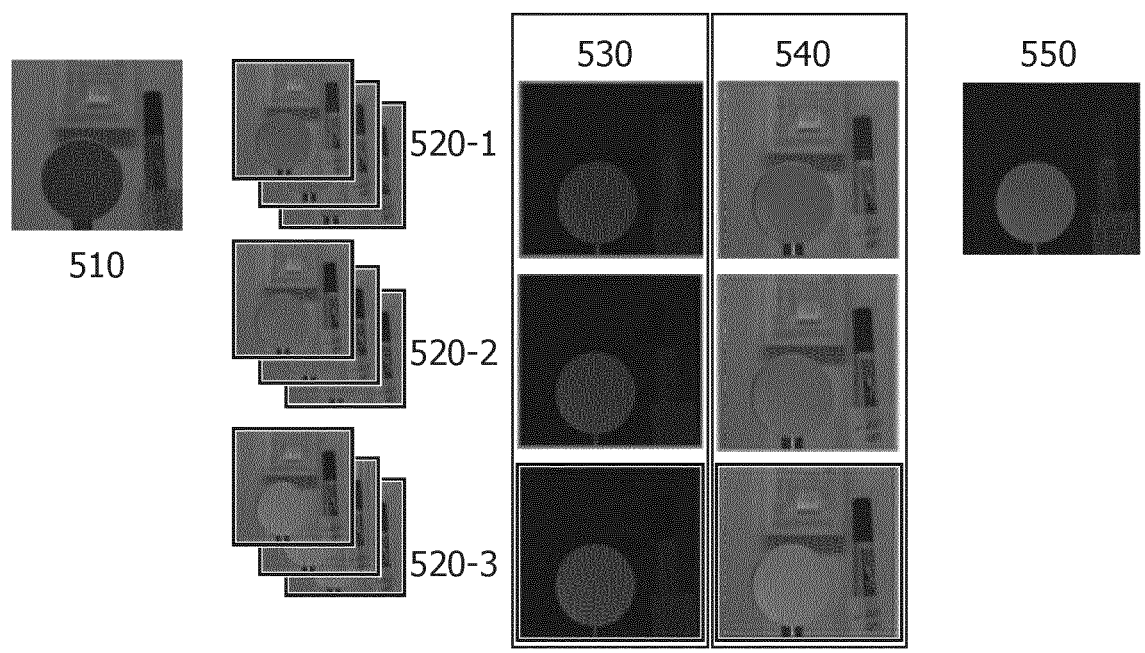
FIG. 5 illustrates an ambient light suppression operation by way of a number of images, according to another embodiment.

FIG. 5 illustrates an ambient light suppression operation by way of a number of images, according to another embodiment. The illustrated operation can generally be performed by the system 200, and specifically in some embodiments by or under the control of processing unit 230 of the system 200. For the purpose of illustration, at least parts of the operation illustrated in FIG. 5 will be described in the following with reference to the various components of the system 200 of FIG. 2.

In the embodiment as illustrated in FIG. 5, the image projection unit 210 of the system 200 is configured to project an illumination pattern having a predetermined spatial frequency. Furthermore, the imaging unit 220 of the system 200 comprises a monochrome camera. The imaging unit 220 is configured to capture the plurality of images of the scene at a predetermined focal depth, respectively for three different colour channels (RGB). The predetermined spatial frequency of the illumination pattern and the predetermined focal depth of the imaging unit are selected such that the illumination pattern is only resolvable within a certain distance from the focus of the imaging unit 220.

As shown in FIG. 5, there is provided three sets of modulated images including a first set of modulated images 520-1, a second set of modulated images 520-2, and a third set of modulated images 520-3. The first set of modulated images 520-1 corresponds to the blue colour channel captured by the monochrome camera, the second set of modulated images 520-2 corresponds to the green colour channel captured by the monochrome camera, and the third set of modulated images 520-3 corresponds to the red colour channel captured by the monochrome camera. Furthermore, in FIG. 5 there is also provided a normal image 510 which represents an image of the scene depicted in the modulated images 520-1, 520-2, and 520-3 captured in normal conditions with no illumination pattern projected. In addition, a set of AC component images 530, a set of DC component images 540, and a resultant image 550 are provided in FIG. 5.

As described with reference to FIG. 2 above, the illumination pattern is a time-varying spatially modulated pattern. Each of the three modulated images in each of the first, second, and third sets of modulated images 520-1, 520-2, 520-3 in this embodiment have been captured at a different point in time that corresponds to a respectively different phase shift of the projected illumination pattern, for example each of these three images in a set may respectively corresponds to a point in time when the illumination pattern has a 0° phase shift, a point in time when the illumination pattern has a 120° phase shift, and a point in time when the illumination pattern has a 240° phase shift.

Furthermore, in this embodiment, the target section corresponds to a portion of the scene at which the projected illumination pattern is resolvable. As shown in FIG. 5, by using the right combination of the predetermined spatial frequency of the illumination pattern and the predetermined focal depth of the imaging unit, there is a distance from the focused object in the scene for which the illumination pattern cannot be resolved. In more detail, it can be seen for the present embodiment in each image of each of the first set of modulated images 520-1, the second set of modulated images 520-2, and the third set of modulated image 520-3, the projected illumination pattern (which consists of a plurality of alternate horizontal dark and bright bands) is only distinguishable on the round element and the pen, but not in the background (objects located more than 1 m from the focal depth) of the scene.

Once the three sets of modulated images 520-1, 520-2, 520-3 have been captured, the processing unit 230 of the system 200 can demodulate the three sets of modulated images 520-1, 520-2, 520-3 based on the illumination pattern depicted in these modulated images, as well as with respect to a target section, which in this embodiment corresponds to the portion of the scene at which the projected illumination pattern is resolvable. Subsequently, the processing unit 230 can generate an ambient light suppressed image of the scene based on the results of the demodulation.

In more detail, the processing unit 230 can demodulate each of the three sets of the modulated images 510-1, 520-2, 520-3 with respect to the target section to respectively generate three AC component images which respectively correspond to the blue colour channel, the green colour channel, and the red colour channel. These three AC component images form the set of AC component images 530 as shown in FIG. 5. Also, the demodulation operation can also generate three DC component images which respectively correspond to the blue colour channel, the green colour channel, and the red colour channel. These three DC component images form the set of DC components images 540 as shown in FIG. 5. It will be appreciated that the demodulation may be performed, for example, using formulae (1) and (2) as presented above with reference to FIG. 1. It will also be appreciated that other formulae not explicitly discussed here may be used for obtaining the AC and DC components of the signal, e.g. those associated with Discrete Cosine Transform, Fourier transform, etc.

In this case, the set AC component image 530 is selected and subsequently processed (i.e. RGB reconstruction) to generate an ambient light suppressed image 550 of the scene. Thus, elements that are in the background (with focal depth more than 1 m) of the scene of the modulated images can be excluded in the ambient light suppressed image 550 of the scene. In other words, in this embodiment the generated ambient light suppressed image 550 of the scene only depicts element(s) included in the foreground at which the illumination pattern is resolvable.

Figure 6:
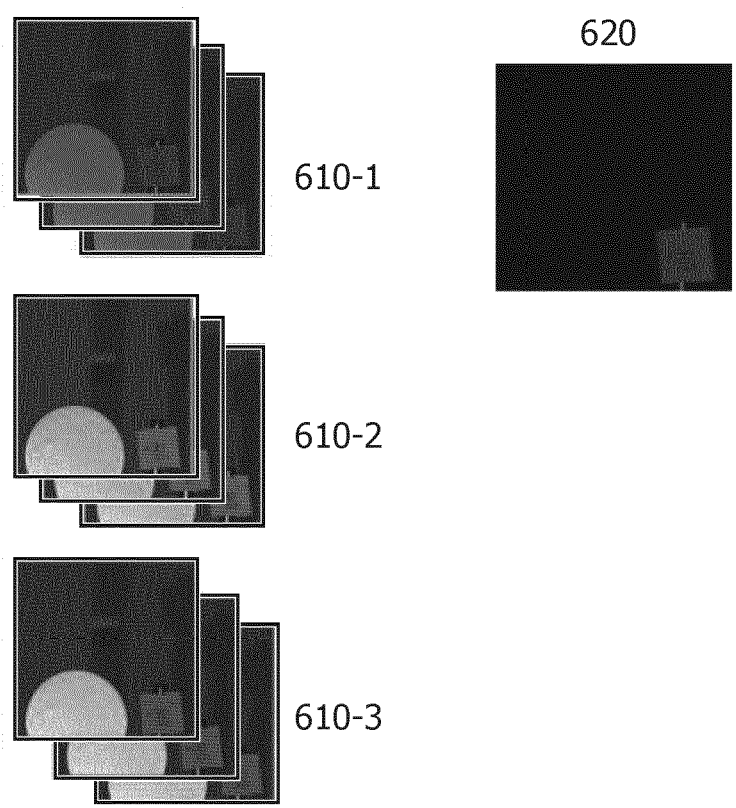
FIG. 6 illustrates an ambient light suppression operation by way of a number of images, according to another embodiment.

FIG. 6 illustrate an ambient light suppression operation by way of a number of images, according to another embodiment. The illustrated operation can generally be performed by the system 200, and specifically in some embodiments by or under the control of processing unit 230 of the system 200. For the purpose of illustration, at least parts of the operation illustrated in FIG. 6 will be described in the following with reference to the various components of the system 200 of FIG. 2.

Similar to the arrangement as illustrated in FIG. 5, in the embodiment of FIG. 6 the image projection unit 210 of the system 200 is configured to project an illumination pattern having a predetermined spatial frequency. Furthermore, also similar to the arrangement as illustrated in FIG. 5, in this embodiment the imaging unit 220 of the system 200 comprises a monochrome camera. The imaging unit 220 is configured to capture the plurality of images of the scene at a predetermined focal depth, respectively for three different colour channels (RGB). The predetermined spatial frequency of the illumination pattern and the predetermined focal depth of the imaging unit are selected such that the illumination pattern is only resolvable within a certain distance from the focus of the imaging unit 220.

As shown in FIG. 6, there is provided three sets of modulated images including a first set of modulated images 610-1, a second set of modulated images 610-2, and a third set of modulated images 610-3. The first set of modulated images 610-1 corresponds to the blue colour channel captured by the monochrome camera, the second set of modulated images 610-2 corresponds to the green colour channel captured by the monochrome camera, and the third set of modulated images 610-3 corresponds to the red colour channel captured by the monochrome camera.

As described with reference to FIG. 2 above, the illumination pattern is a time-varying spatially modulated pattern. Each of the three modulated images in each of the first, second, and third sets of modulated images 610-1, 611-2, 610-3 in this embodiment have been captured at a different point in time that corresponds to a respectively different phase shift of the projected illumination pattern, for example each of these three images in a set may respectively corresponds to a point in time when the illumination pattern has a 0° phase shift, a point in time when the illumination pattern has a 120° phase shift, and a point in time when the illumination pattern has a 240° phase shift.

Furthermore, in this embodiment, the target section corresponds to a portion of the scene at which the projected illumination pattern is resolvable. As shown in FIG. 6, by using the right combination of the predetermined spatial frequency of the illumination pattern and the predetermined focal depth of the imaging unit, there is a distance from the focused object in the scene for which the illumination pattern cannot be resolved. In more detail, it can be seen for the present embodiment in each image of each of the first set of modulated images 610-1, the second set of modulated images 610-2, and the third set of modulated image 610-3, the projected illumination pattern (which consists of a plurality of alternate horizontal dark and bright bands) is only distinguishable on a rectangular object in the background of the scene.

Once the three sets of modulated images 610-1, 610-2, 610-3 have been captured, the processing unit 230 of the system 200 can demodulate the three sets of modulated images 610-1, 610-2, 610-3 based on the illumination pattern depicted in these modulated images, as well as with respect to a target section, which in this embodiment corresponds to the portion of the scene at which the projected illumination pattern is resolvable. Subsequently, the processing unit 230 can generate an ambient light suppressed image of the scene based on the results of the demodulation.

In more detail, the processing unit 230 can demodulate each of the three sets of the modulated images 610-1, 620-2, 620-3 with respect to the target section to respectively generate three AC component images which respectively correspond to the blue colour channel, the green colour channel, and the red colour channel. Also, the demodulation operation can also generate three DC component images which respectively correspond to the blue colour channel, the green colour channel, and the red colour channel. In this case, the set AC component image can be selected and subsequently processed (i.e. RGB reconstruction) to generate an ambient light suppressed image 620 of the scene. It will be appreciated that the demodulation may be performed, for example, using formulae (1) and (2) as presented above with reference to FIG. 1. It will also be appreciated that other formulae not explicitly discussed here may be used for obtaining the AC and DC components of the signal, e.g. those associated with Discrete Cosine Transform, Fourier transform, etc.

Thus, elements that are in the foreground of the scene of the modulated images can be excluded in the ambient light suppressed image 620 of the scene. In other words, in this embodiment the generated ambient light suppressed image 620 of the scene only depicts certain element(s) included in the background at which the illumination pattern is resolvable.

Although it is described with reference to some embodiments above that each set of modulated images corresponding to a colour channel comprises three images, it will be appreciated that in alternative embodiments each set of modulated images may comprise fewer or more images, depending on for example the amount of time and resources available, the motion of the target or of the system itself, as well as a desired level of ambient light suppression, etc.

Figure 7:
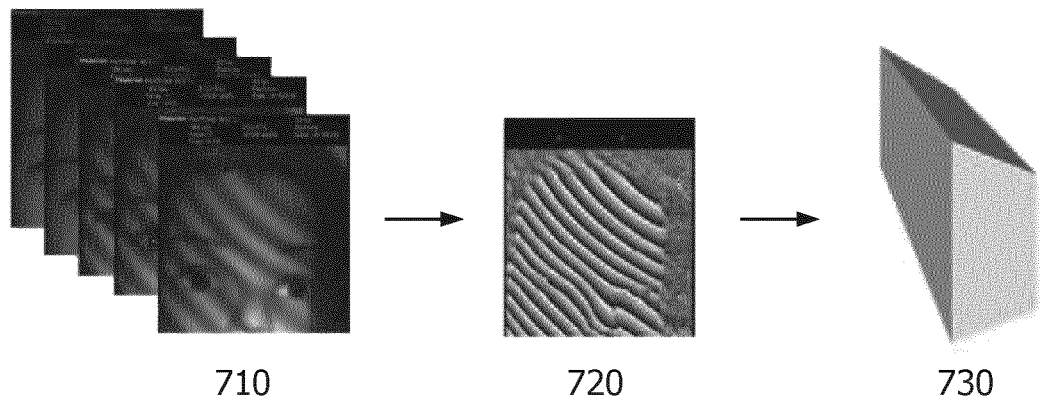
FIG. 7 illustrates an ambient light suppression operation according to another embodiment.

FIG. 7 illustrates an ambient light suppression operation according to another embodiment. The illustrated operation can generally be performed by the system 200, and specifically in some embodiments by or under the control of processing unit 230 of the system 200. For the purpose of illustration, at least parts of the operation illustrated in FIG. 7 will be described in the following with reference to the various components of the system 200 of FIG. 2.

As shown in FIG. 7, there is provided a plurality of modulated images 710. As described with reference to FIG. 2 above, the illumination pattern is a time-varying spatially modulated pattern, thus each of the plurality of modulated images 710 in this embodiment may have been captured at a different point in time that corresponds to a respectively different phase shift of the projected illumination pattern. Furthermore, the illumination pattern in this embodiment further comprises at least one phase ramp of a predetermined step size.

Once the plurality of modulated images 7103 have been captured, the processing unit 230 of the system 200 can demodulate the modulated images based on the illumination pattern depicted in these modulated images, as well as with respect to a target section. As will be explained in more detail in the paragraph below, the target section in the present embodiment is based on 3D depth information of the scene depicted in the plurality of modulated images 710.

In this embodiment, the processing unit 230 is configured to analyse the plurality of modulated images 710 to determine 3D depth information of the scene depicted. In more detail, a phase mask can applied to the plurality of modulated images 710—this operation is represented by the phase mask 720 in FIG. 7, and is performed prior to the determination of the 3D depth information of the scene. The 3D depth information comprises depth values for each of the pixels of the plurality of modulated images 710. Once the 3D depth information of the scene is determined, the processing unit 230 is configured to determine the target section based on the 3D depth information of the scene depicted. The 3D depth information of the scene is represented by the 3D depth model 730 as shown in FIG. 7. As an example of the operation of determining the target section in this embodiment, the processing unit 230 may be configured to select one or more portions in the plurality of modulated images 710 that correspond to a predetermined range of 3D depth values, e.g. a portion corresponding to the face of a user.

Subsequently, the processing unit 230 can generate an ambient light suppressed image of the scene based on the results of the demodulation. Specifically, in this embodiment, the processing unit 230 is configured to generate the ambient light suppressed image of the scene by only outputting the demodulation results with respect to the target section. Thus, elements that are not depicted in the target section (e.g. if the 3D depth values of the corresponding pixels do not fall within a predetermined range) can be excluded in the ambient light suppressed image of the scene. In other words, in this embodiment the generated ambient light suppressed image of the scene only depicts certain element(s) that fulfil certain criteria with respect to 3D depth values.

Figure 8:
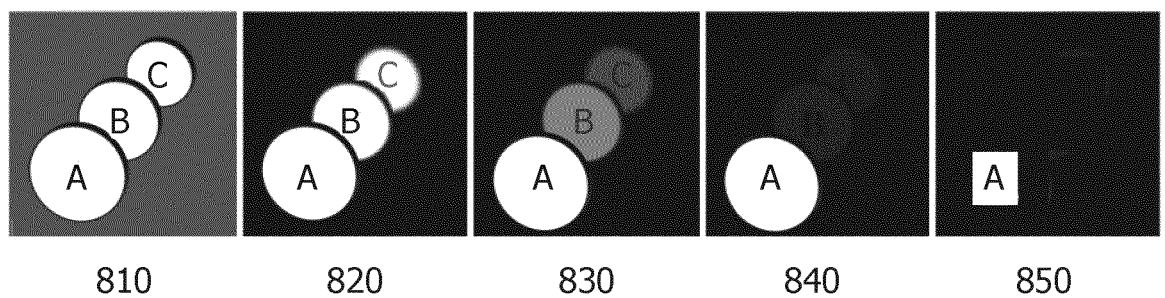
FIG. 8 illustrates a result of an ambient light suppression operation according to an embodiment compared with other imaging or processing techniques.

FIG. 8 illustrates a result of an ambient light suppression operation according to an embodiment compared with other imaging or processing techniques.

For the purpose of reference, a normal image (without image processing or modulation) 810 is provided. As shown in the normal image 810, a first element A, a second element B, and a third element C are depicted. The first to third elements A to C as depicted corresponds to a number of different distances of the respective element to an imaging unit, with the first element A being closest to the imaging unit and the third element C being furthest away from the imaging unit.

A blurred image 820 is provided next to the normal image 810. The blurred image 820 represents a resultant image subsequent to performing a blurring processing on the normal image 810 as an attempt to remove some of the details depicted. In the example shown in the blurred image 820, image processing is performed so as to remove details that are in the background of the normal image 810, i.e. the third element C.

A first ambient light correction (ALC) image 830 is provided next to the blurred image 820. The first ALC image 830 represents a resultant image subsequent to performing a wide illumination ambient light correction processing on the normal image 810 as an attempt to remove some of the details depicted. Similar to the blurred image 820 described above, in the example shown in the first ALC image 830, image processing is performed on modulated images so as to remove details that are in the background. Compared to simply performing blurring, it can be shown that wide illumination ambient light correction is more effective in removing background details, e.g. the third element C.

Furthermore, a second ALC image 840 and a third ALC image 850 are provided next, where the second ALC image 840 and the third ALC image 850 represent resultant images subsequent to performing ambient light suppression operations as described in embodiments described herein. Specifically, in this embodiment illumination patterns are only selectively projected onto a selected portion of the field of view of the image unit while a plurality of modulated images are captured. In the example of the second ALC image 840, the selected portion corresponds to a portion depicting the first element A, and in the example of the third ALC image 850, the selected portion corresponds to a rectangular portion depicting a part of the first element A. Thus, the target section corresponds to a portion of the scene on which the illumination pattern is selectively projected.

In both of the examples presented by the second ALC image 840 and the third ALC image 850, the modulated images are demodulated with respect to the respective target section, such that the respective generated ambient light suppressed image of the scene only depicts one or more elements included in the selected portion of the field of view of the imaging unit. Accordingly, as shown in the second ALC image 840 and the third ALC image 850, only element A is depicted and only a part of element A is depicted in the respective results.

There is thus provided an improved system for performing ambient light suppression and a method of controlling thereof. Embodiments described herein allow improved suppression of background element(s) in images, as compared to currently known techniques for shallow depth-of-field detection imaging (e.g. including blurring) or wide illumination ambient light correction. This is because the techniques described herein offer a better approach of removing out-of-focus portions from images as well as an improved way to perform sub-selection of in-focus portions in images.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for performing ambient light suppression, the system comprising:
   an image projection unit configured to project an illumination pattern onto at least a portion of a scene, wherein the illumination pattern is a time-varying spatially modulated pattern having a predetermined spatial frequency;
   an imaging unit having a field of view, the imaging unit being configured to capture a plurality of images of the scene while the illumination pattern is projected onto the scene; and
   a processing unit configured to:
      demodulate the plurality of images based on the illumination pattern and with respect to a target section in the captured plurality of images, wherein the target section is a part of the field of view of the imaging unit and corresponds to one of:
         a portion of the scene on which the illumination pattern is selectively projected while the plurality of images were captured,
         a portion of the scene at which the projected illumination pattern is resolvable, or
         a portion of the scene with pixel depth values for pixels of the plurality of images which satisfy a predetermined range;
      and
      generate an ambient light suppressed image of the scene by suppressing ambient light based on results of the demodulation.

2. The system according to claim 1, wherein the image projection unit is configured to only selectively project the illumination pattern onto a selected portion of the field of view of the imaging unit, and the target section corresponds to a portion of the scene on which the illumination pattern is selectively projected, and
   wherein the processing unit is configured to demodulate the plurality of images with respect to the target section such that the generated ambient light suppressed image of the scene only depicts one or more elements included in the selected portion of the field of view of the imaging unit.

3. The system according to claim 1,
   wherein the processing unit is configured to analyse the plurality of images to determine 3D depth information of the scene, wherein the 3D depth information comprises the pixel depth value for each of the pixels of the plurality of images and the target section is based on the 3D depth information of the scene,
   wherein the processing unit is configured to generate the ambient light suppressed image of the scene by only outputting the demodulation results with respect to the target section.

4. The system according to claim 3, wherein the processing unit is configured to determine the target section by applying a phase mask to the plurality of images.

5. The system according to claim 1, wherein the time-varying, spatially modulated pattern comprises a phase-shifting sinusoidal pattern, and wherein the imaging unit is configured to capture the plurality of images at a predetermined phase difference with respect to a phase of the sinusoidal pattern.

6. The system according to claim 1, wherein the illumination pattern further comprises at least one phase ramp of a predetermined step size.

7. The system according to claim 1, wherein the time-varying spatially modulated pattern comprises a phase-shifting sinusoidal pattern, and wherein the imaging unit is configured to capture, while the illumination pattern is projected onto the scene, three sets of images, wherein a first set of the three sets of images corresponds to a 0° phase shift of the sinusoidal pattern, a second set of the three sets of images corresponds to 120° phase shift of the sinusoidal pattern, and a third set of the three sets of images corresponds to 240° phase shift of the sinusoidal pattern.

8. The system according to claim 7, wherein the imaging unit comprises a colour camera, and each of the first, second, and third set of images comprises a single image.

9. The system according to claim 7, wherein each of the first, second and third set of images comprises three images, wherein a first image in each of the three of sets of images corresponds to a red colour channel, a second image in each of the three sets of images corresponds to a green colour channel, and a third image in each of the three sets of images corresponds to a blue colour channel.

10. The system according to claim 1, wherein the processing unit is configured to demodulate the plurality of images to produce a first image corresponding to an AC component and a second image correspond to a DC component, wherein the first image is selected as the ambient light suppressed image of the scene.

11. A system for performing ambient light suppression, the system comprising:

an image projection unit configured to project an illumination pattern onto at least a portion of a scene wherein the illumination pattern is a time-varying spatially modulated pattern having a predetermined spatial frequency;

an imaging unit having a field of view, the imaging unit being configured to capture a plurality of images of the scene while the illumination pattern is projected onto the scene, wherein the imaging unit is configured to capture the plurality of images of the scene at a predetermined focal depth, the predetermined spatial frequency of the illumination pattern and the predetermined focal depth of the imaging unit being selected such that the illumination pattern is only resolvable within a certain distance from a focus of the imaging unit; and a processing unit configured to:

demodulate the plurality of images based on the illumination pattern and with respect to a target section in the captured plurality of images, wherein the target section is a part of the field of view of the imaging unit and corresponds to a portion of the scene at which the projected illumination pattern is resolvable; and generate an ambient light suppressed image of the scene based on results of the demodulation, wherein the processing unit is configured to demodulate the plurality of images with respect to the target section such that the generated ambient light suppressed image of the scene only depicts one or more elements included in the field of view within the certain distance from the focus of the imaging unit.

12. A method for controlling a system to perform ambient light suppression, wherein the system comprises an image projection unit, an imaging unit, and a processing unit, the method comprising:

projecting, by the image projection unit, an illumination pattern onto at least a portion of a scene, wherein the illumination pattern is a time-varying spatially modulated pattern having a predetermined spatial frequency;

capturing, by the imaging unit, a plurality of images of the scene while the illumination pattern is projected onto the scene; and demodulating, by the processing unit, the plurality of images based on the illumination pattern and with respect to a target section in the captured plurality of images, wherein the target section is a part of a field of view of the imaging unit and corresponds to one of:

a portion of the scene on which the illumination pattern is selectively projected while the plurality of images were captured, a portion of the scene at which the projected illumination pattern is resolvable, a portion of the scene with pixel depth values for pixels which satisfy a predetermined range;

and generating, by the processing unit, an ambient light suppressed image of the scene by suppressing ambient light based on results of the demodulation.

13. The method according to claim 12, wherein projecting the illumination pattern onto at least a portion of the scene comprises only selectively projecting the illumination pattern onto a selected portion of the field of view of the imaging unit, and wherein the target section corresponds to a portion of the scene on which the illumination pattern is selectively projected, and wherein demodulating the plurality of images with respect to the target section is performed such that the generated ambient light suppressed image of the scene only depicts one or more elements included in the selected portion of the field of view of the imaging unit.

14. The method according to claim 12, wherein capturing the plurality of images of the scene is performed at a predetermined focal depth, wherein the predetermined spatial frequency of the illumination pattern and the predetermined focal depth of the imaging unit are selected such that the illumination pattern is only resolvable within a certain distance from a focus of the imaging unit, and wherein the target section corresponds to a portion of the scene at which the projected illumination pattern is resolvable, and wherein demodulating the plurality of images with respect to the target section is performed such that the generated ambient light suppressed image of the scene only depicts one or more elements included in the field of view within the certain distance from the focus of the imaging unit.

15. A non-transitory computer readable medium having computer readable code embodied therein, the computer readable code being configured such that, on execution by a suitable computer or processor, the computer or processor is caused to perform the method according to claim 12.

16. The method according to claim 12, further comprising:

analyzing the plurality of images to determine 3D depth information of the scene, wherein the 3D depth information comprises the pixel depth values for the pixels of the plurality of images and the target section is based on the 3D depth information of the scene, wherein the ambient light suppressed image of the scene is generated by only outputting the demodulation results with respect to the target section.

17. The method according to claim 16, further comprising:
   determining the target section by applying a phase mask to the plurality of images.

18. The method according to claim 12, wherein the time-varying spatially modulated pattern comprises a phase-shifting sinusoidal pattern, and wherein the plurality of images are captured at a predetermined phase difference with respect to a phase of the sinusoidal pattern.

19. The method according to claim 12, wherein the time-varying spatially modulated pattern comprises a phase-shifting sinusoidal pattern, and
   wherein capturing the plurality of images of the scene while the illumination pattern is projected onto the scene comprises capturing three sets of images, wherein a first set of the three sets of images corresponds to a 0° phase shift of the sinusoidal pattern, a second set of the three sets of images corresponds to 120° phase shift of the sinusoidal pattern, and a third set of the three sets of images corresponds to 240° phase shift of the sinusoidal pattern.

20. The method according to claim 19, wherein each of the first, second and third set of images comprises three images, wherein a first image in each of the three of scats of images corresponds to a red colour channel, a second image in each of the three sets of images corresponds to a green colour channel, and a third image in each of the three sets of images corresponds to a blue colour channel of the imaging unit.

\* \* \* \* \*